United States Patent
Yamada et al.

(10) Patent No.: US 7,013,042 B1
(45) Date of Patent: Mar. 14, 2006

(54) IMAGE PROCESSING APPARATUS AND METHOD, AND RECORDING MEDIUM

(75) Inventors: Osamu Yamada, Tokyo (JP); Takahiro Matsuura, Yokohama (JP)

(73) Assignee: Canon Research Kaisha, Tokyo (JP)

( * ) Notice: Subject to any disclaimer, the term of this patent is extended or adjusted under 35 U.S.C. 154(b) by 0 days.

(21) Appl. No.: 09/420,775

(22) Filed: Oct. 19, 1999

(30) Foreign Application Priority Data

Oct. 19, 1998 (JP) .................................. 10-297284

(51) Int. Cl.
  *G06K 9/00* (2006.01)
(52) U.S. Cl. ........................................ 382/167; 358/520
(58) Field of Classification Search ........ 382/162–167, 382/168–173, 274–275, 254; 358/515–524, 358/1.9, 520, 3.23, 500, 501, 518–523; 348/672, 348/671, 674, 675, 678–686, 603, 645, 650, 348/223.1; 345/589–604
See application file for complete search history.

(56) References Cited

U.S. PATENT DOCUMENTS

| | | | | |
|---|---|---|---|---|
| 4,792,847 A | * | 12/1988 | Shimazaki et al. | ......... 358/521 |
| 5,335,097 A | * | 8/1994 | Murakami | .................. 358/520 |
| 5,450,217 A | * | 9/1995 | Eschbach et al. | ............ 358/518 |
| 5,742,296 A | | 4/1998 | Yamada et al. | ............. 345/431 |
| 5,748,773 A | | 5/1998 | Tashiro et al. | .............. 382/169 |
| 5,808,697 A | * | 9/1998 | Fujimura et al. | ........... 348/672 |
| 6,031,543 A | * | 2/2000 | Miyashita et al. | .......... 345/593 |
| 6,057,931 A | * | 5/2000 | McConnell et al. | ......... 358/1.9 |
| 6,608,926 B1 | * | 8/2003 | Suwa et al. | .................. 382/162 |
| 6,868,179 B1 | * | 3/2005 | Gruzdev et al. | ............ 382/167 |

\* cited by examiner

*Primary Examiner*—Bhavesh M. Mehta
*Assistant Examiner*—Ishrat Sherali
(74) *Attorney, Agent, or Firm*—Fitzpatrick, Cella, Harper & Scinto

(57) ABSTRACT

When saturation conversion is done by multiplying data by a saturation conversion parameter with a constant value regardless of image features, an image which can give good impression to the user cannot always be obtained.

In this invention, an image is segmented into a predetermined number of blocks, and attributes are discriminated in units of blocks. Conversion characteristics are calculated on the basis of saturation conversion parameters of an image, which are set in correspondence with the discrimination result, and saturation is converted based on the calculated characteristics. In this way, appropriate saturation correction can be achieved in correspondence with the image attribute.

18 Claims, 15 Drawing Sheets

FIG. 4

| ITEM | VALUE |
|---|---|
| HIGHLIGHT POINT OF IMAGE(LH) | ### |
| WHITE BALANCE    RED(RH) | ### |
| WHITE BALANCE    GREEN(GH) | ### |
| WHITE BALANCE    BLUE(BH) | ### |
| CORRECTED HIGHLIGHT POINT(HP) | ### |
| HIGHLIGHT AREA | ##%~##% |
| SHADOW POINT OF IMAGE(LS) | ### |
| BLACK BALANCE    RED(RS) | ### |
| BLACK BALANCE    GREEN(GS) | ### |
| BLACK BALANCE    BLUE(BS) | ### |
| CORRECTED SHADOW POINT(SP) | ### |
| SHADOW AREA | ##%~##% |
| LOW-SATURATION SIDE SATURATION CONVERSION PARAMETER | ### |
| HIGH-SATURATION SIDE SATURATION CONVERSION PARAMETER | ### |
| ATTRIBUTE DEPENDENT SATURATION A (FLESH TONE) | ### |
| ATTRIBUTE DEPENDENT SATURATION B (GREEN OF PLANT) | ### |
| ATTRIBUTE DEPENDENT SATURATION C (BLUE OF SKY) | ### |

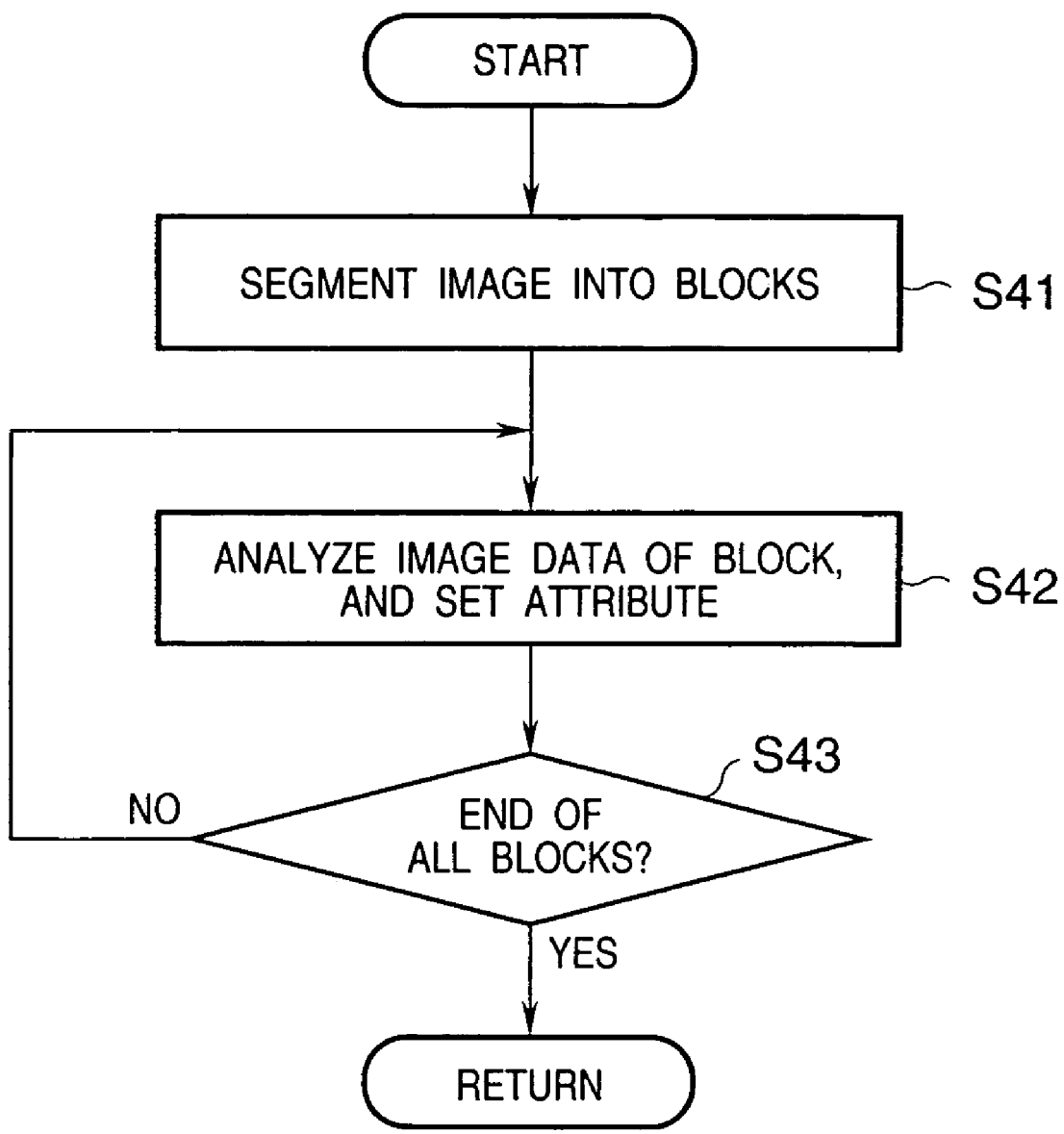

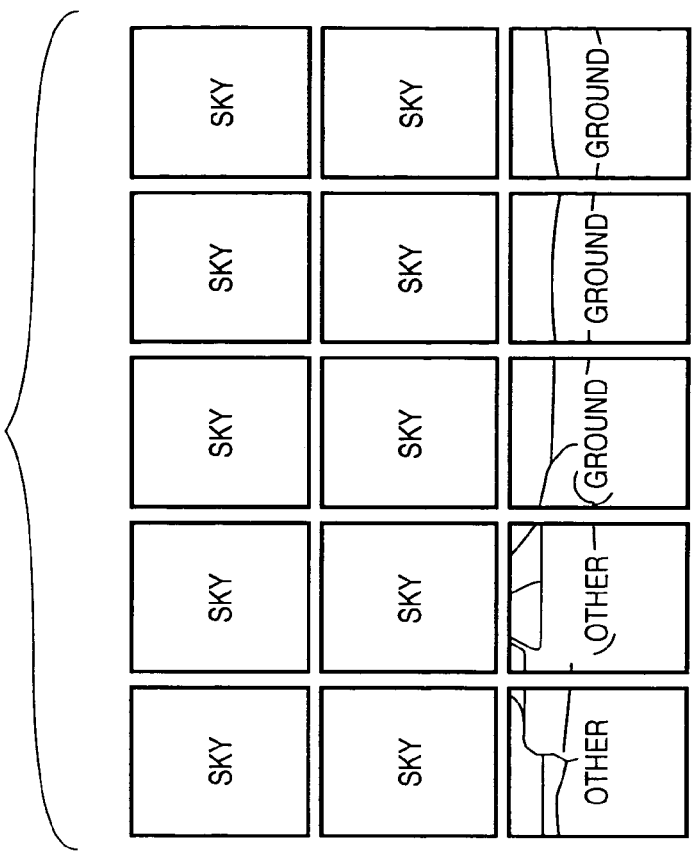
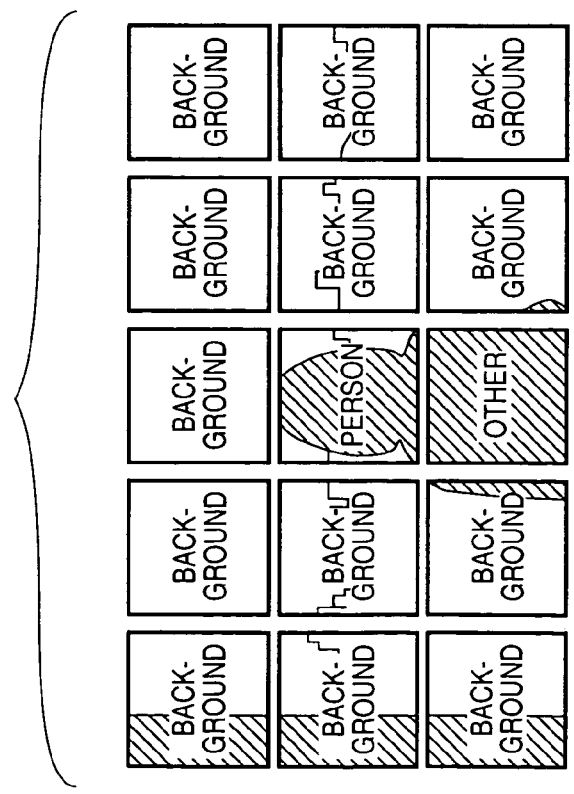

IMAGE PROCESSING APPARATUS AND METHOD, AND RECORDING MEDIUM

BACKGROUND OF THE INVENTION

This invention relates to an image processing apparatus and method for performing saturation conversion.

In general, an image processing apparatus for forming a multi-valued image performs so-called saturation conversion to obtain an image with appropriate saturation by compensating saturation for a less saturated area in an image, and suppressing saturation for an oversaturated area.

In order to implement saturation conversion in a conventional image processing apparatus, saturation values (normally ranging from 0.0 to 1.0) are calculated in units of pixels in an image, and the saturation value of each pixel is corrected by multiplying the saturation value by a predetermined saturation conversion parameter.

However, the conventional image processing apparatus always performs saturation conversion based on a saturation conversion parameter with a constant value regardless of the image feature of the image to be converted.

In general, of colors that the image processing apparatus can reproduce, the flesh tone of a human being, green of plants, blue of sky, and the like are known as colors that a person especially notices and reacts sensitively to their delicate conversion results. Such colors will be referred to as "memory color" hereinafter. Optimal saturation values of these memory color vary depending on their color types. Hence, impression of an image differs depending on the saturation values of these memory color.

Hence, when a process for simply increasing or suppressing saturation at a given rate for the entire image is done regardless of the presence of memory color in the image as in the conventional apparatus, an image which can give good impression to the user cannot always be obtained. That is, it is desired to change the degree of saturation conversion in correspondence with the presence/absence of memory color in an image, or their color types if they are present.

SUMMARY OF THE INVENTION

Accordingly, it is an object of the present invention to provide an image processing apparatus and method, which can implement appropriate saturation conversion in correspondence with image characteristics, and a recording medium.

According the present invention, the foregoing object is attained by providing an image processing apparatus comprising: characteristic discrimination means for discriminating characteristics of an image; saturation calculation means for calculating saturation information of the image; parameter setting means for setting a parameter used to convert saturation of the image in accordance with the characteristics discriminated by said characteristic discrimination means; and saturation conversion means for converting the saturation of the image on the basis of the parameter.

With this apparatus, the characteristic discrimination means discriminates the image characteristics, the saturation calculation means calculates saturation information of an image, the parameter discrimination means sets a parameter for converting the saturation of the image in correspondence with the characteristics, and the saturation conversion means can convert the saturation of the image on the basis of the set parameter.

The invention is particularly advantageous since saturation conversion can be done in correspondence with the image characteristics.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing an example of data items held by a parameter holding block;

FIG. 5 is a flow chart showing an image attribute discrimination process;

FIGS. 6A and 6B are views showing examples of image attribute discrimination results;

DESCRIPTION OF THE PREFERRED EMBODIMENTS

Preferred embodiments of the present invention will now be described in detail in accordance with the accompanying drawings.

[Apparatus Arrangement]

An example of the arrangement of an image processing apparatus according to an embodiment of the present invention will be described in detail hereinafter with reference to the accompanying drawings. Note that the image processing apparatus of the present invention is implemented by an apparatus comprising the hardware arrangement (e.g., a computer apparatus such as a personal computer), as shown in, e.g., FIG. 1, or by supplying software having functions (to be described later) to a dedicated computer apparatus.

Figure 1:
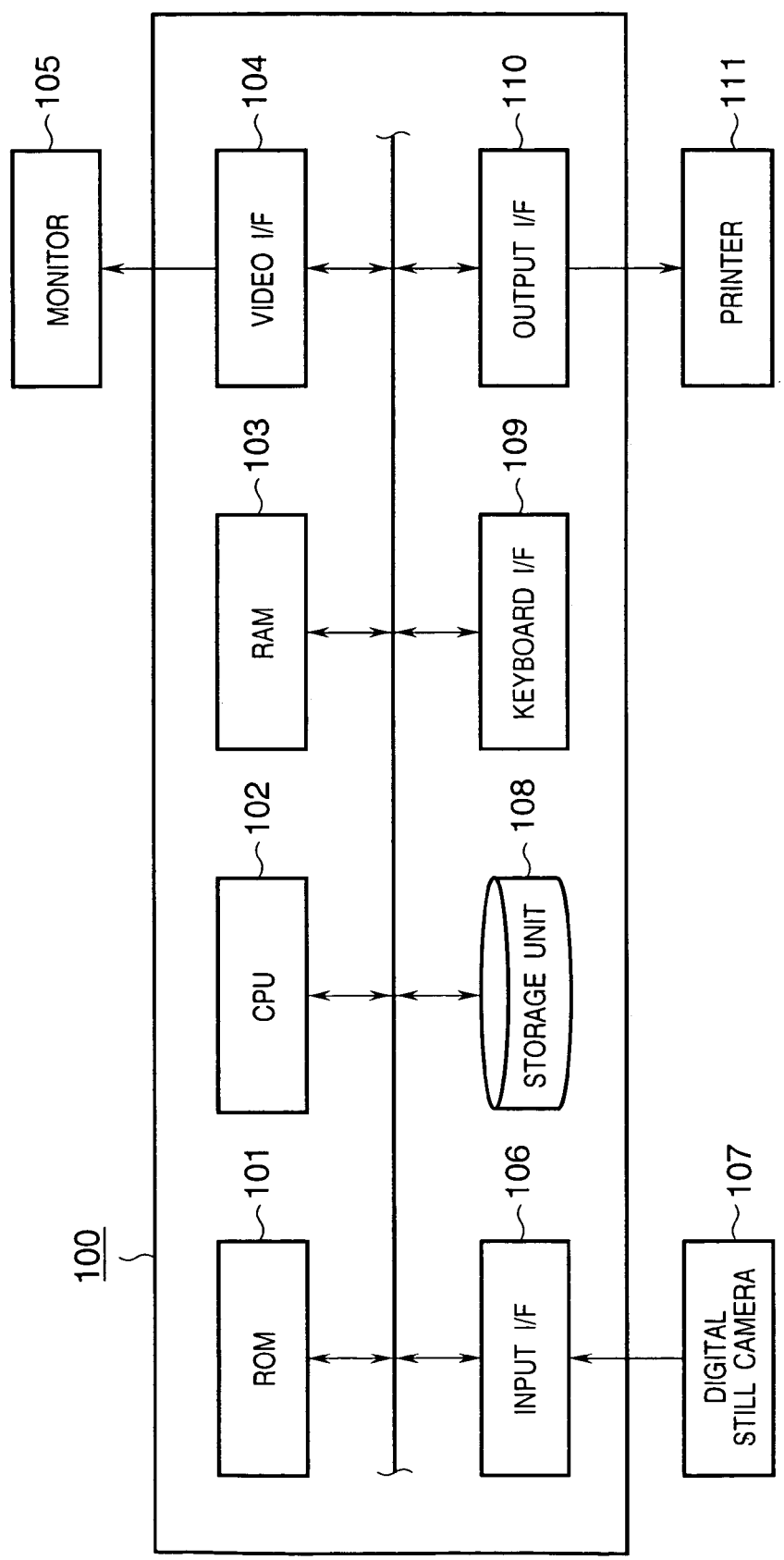
FIG. 1 is a block diagram showing the hardware arrangement of an image processing apparatus according to the present invention.

Referring to FIG. 1, a CPU 102 of a computer apparatus 100 executes a program stored in a ROM 101 or storage unit 108 such as a hard disk or the like using a RAM 103 and the storage unit 108 as a work memory. The program includes at least an operating system (OS) and software for executing processes (to be described later) according to this embodiment.

Image data to be processed by the computer apparatus 100 is input from an input device such as a digital still camera 107 or the like via an input interface (I/F) 106, and is processed by the CPU 102. The processed image data is converted by the CPU 102 into a format corresponding to an output device, and is then sent to an output device such as a printer 111 or the like via an output I/F 110. The input image data, output image data, image data whose processing is underway, and the like can be stored in the storage unit 108 or can be displayed on a monitor 105 such as a CRT, LCD, or the like via a video I/F 104 as needed. These processes and operations can be designated by the user using a keyboard as an input device, a mouse as a pointing device, and the like connected to a keyboard I/F 109.

Note that the input and output I/Fs 106 and 110 can use SCSI as a versatile interface, parallel interfaces such as GPIB, Centronics, and the like, and serial interfaces such as RS232, RS422, IEEE1394, USB (Universal Serial Bus), and the like.

The storage unit 108 can use storage media such as MO, optical disks (e.g., DVD-RAM), and the like in addition to the hard disk. As a device for inputting image data, a digital video camera, image scanner, film scanner, and the like can be used in addition to the digital still camera, or image data can be input from the storage medium or via a communication medium. As a device to which image data is output, printers such as a laser beam printer, ink-jet printer, thermal printer, and the like, a film recorder, and the like can be used. Furthermore, the processed image data may be stored in the storage medium or may be output onto the communication medium.

[Functional Arrangement]

Figure 2:
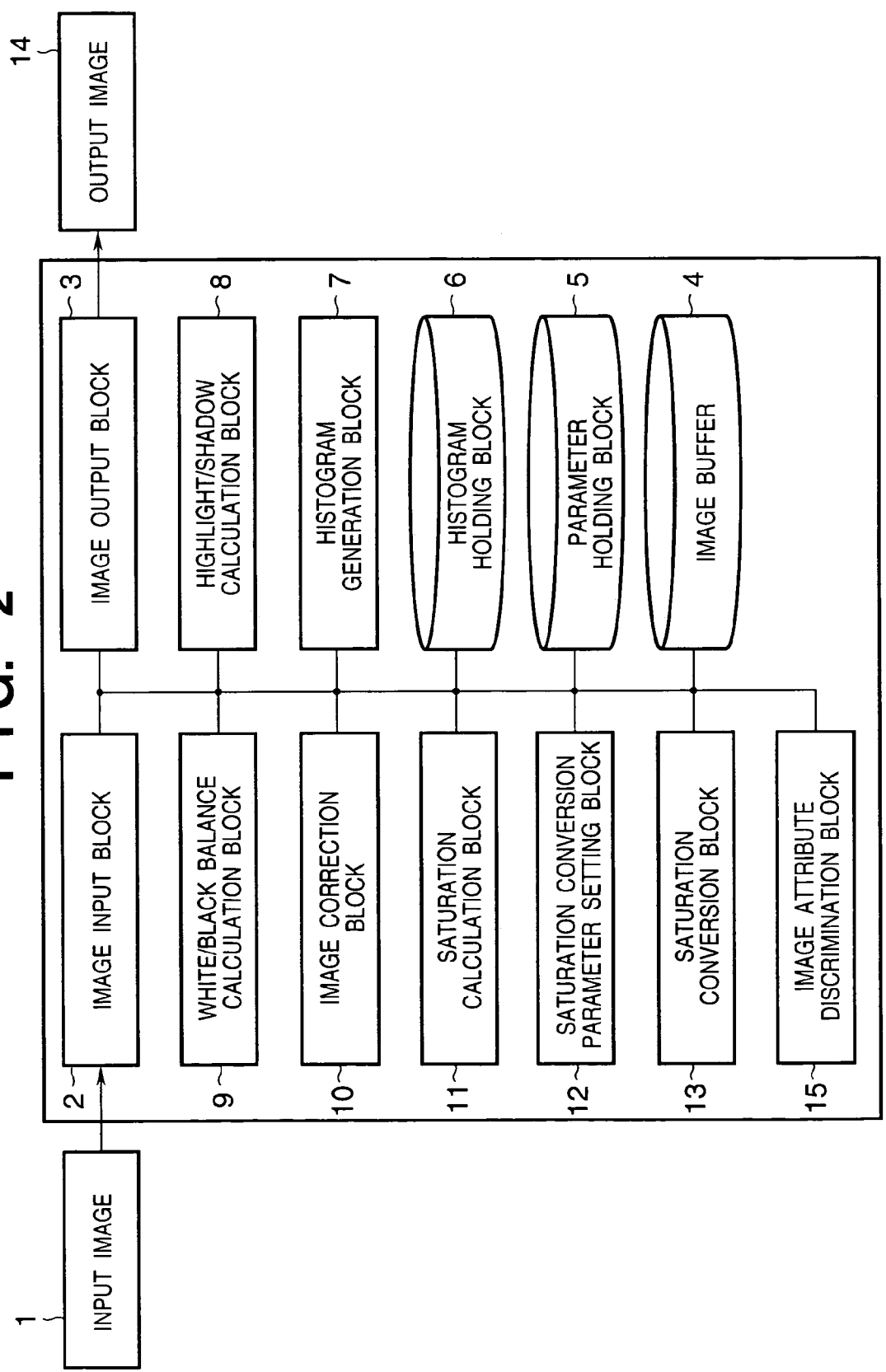
FIG. 2 is a diagram showing an example of the module arrangement of software according to the present invention.

FIG. 2 is a diagram showing an example of the arrangement of function blocks (modules) of software according to this embodiment. In this embodiment, the functional arrangement that implements saturation conversion in this embodiment comprises an image input block 2, image output block 3, image buffer 4, parameter holding block 5, histogram holding block 6, histogram generation block 7, highlight/shadow calculation block 8, white/black balance calculation block 9, image correction block 10, saturation calculation block 11, saturation conversion parameter setting block 12, saturation conversion block 13, and image attribute discrimination block 15.

The image input block 2 loads an input image 1, and writes it in the image buffer 4. The parameter holding block 5 holds parameters (including saturation conversion parameters) required for correction to be described later. The histogram holding block 6 holds a histogram of image data. The histogram generation block 7 generates a histogram based on image data stored in the image buffer 4, and stores the generated histogram in the histogram holding block 6. The highlight/shadow calculation block 8 calculates highlight and shadow points on the basis of the histogram stored in the histogram holding block 6, and stores the calculated points in the parameter holding block 5. The white/black balance calculation block 9 calculates white and black balances, and stores them in the parameter holding block 5.

The image correction block 10 corrects image data stored in the image buffer 4 on the basis of data stored in the parameter holding block 5.

The image attribute discrimination block 15 discriminates the image attributes of image data stored in the image buffer 4.

The saturation calculation block 11 calculates the saturation of image data stored in the image buffer 4. The saturation parameter setting block 12 determines a saturation conversion parameter on the basis of saturation information of an image and user instruction, and stores the determined parameter in the parameter holding block 5. The saturation conversion block 13 converts the saturation of image data stored in the image buffer 4 using the saturation conversion parameter stored in the parameter holding block 5.

The image output block 3 reads out image data stored in the image buffer 4, and outputs it as an output image 14.

[Outline of Image Process]

Figure 3:
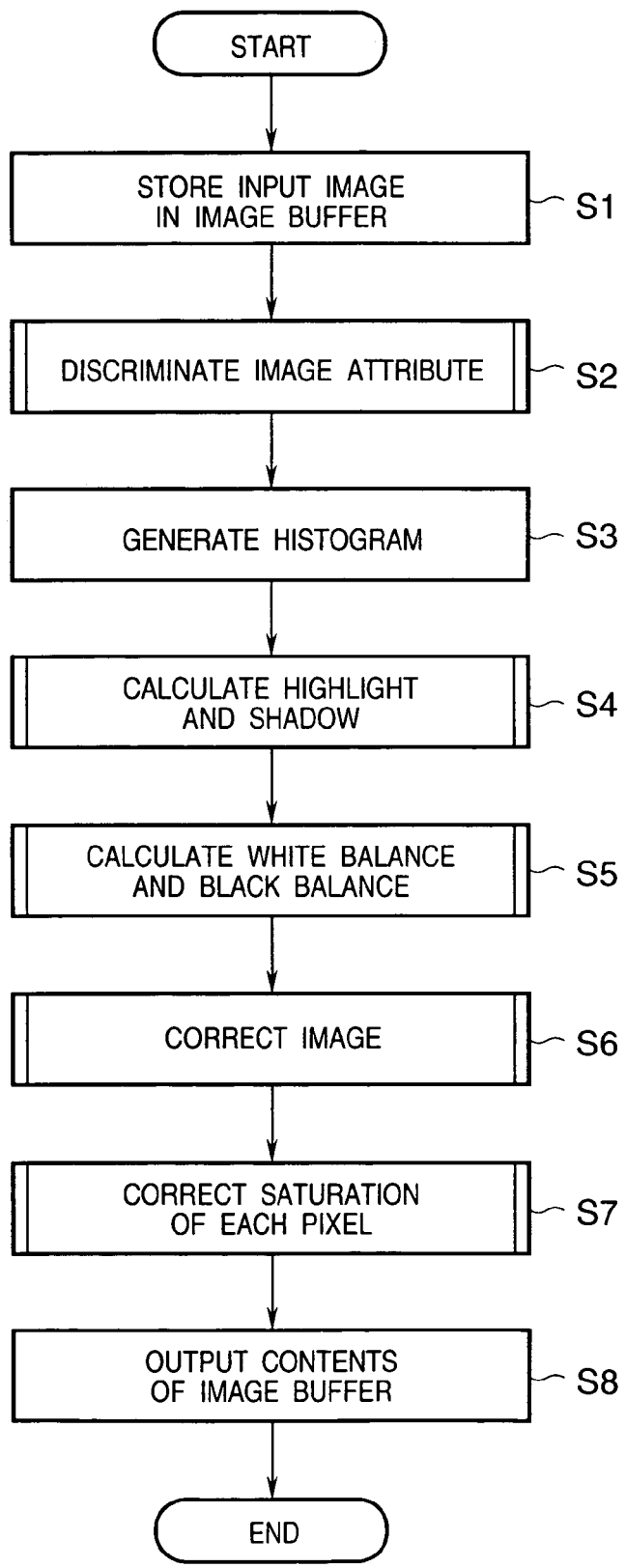
FIG. 3 is a flow chart showing an outline of an image process in the present invention.

FIG. 3 is a flow chart showing an out line of an image process in this embodiment. In step S1, the image input block 2 loads an input image 1, and stores it in the image buffer 4. In step S2, the image attribute discrimination block 15 discriminates the attributes of the image on the basis of the image data stored in the image buffer 4. Note that the operation of the image attribute discrimination block 7 will be described in detail later with reference to FIG. 5.

In step S3, the histogram generation block 7 generates a luminance histogram on the basis of the image data stored in the image buffer 4, and stores the generated histogram in the histogram holding block 6.

In step S4, the highlight/shadow calculation block 8 calculates highlight and shadow points of the image on the basis of the luminance histogram stored in the histogram holding block 6. Note that the operation of the highlight/shadow calculation block 8 will be described in detail later with reference to FIG. 7.

In step S5, the white/black balance calculation block 9 calculates the white and black balances of the image data stored in the image buffer 4. Note that the operation of the white/black balance calculation block 9 will be described in detail later with reference to FIG. 9.

In step S6, the image correction block 10 loads the image from the image buffer 4, corrects it in units of pixels, and writes the corrected image again in the image buffer 4. Note that the operation of the image correction block 10 will be described in detail later with reference to FIG. 10.

In step S7, the saturation calculation block 11 loads the image from the image buffer 4 and calculates saturation values in units of pixels. Also, the saturation parameter setting block 12 determines saturation parameters on the basis of the calculated saturation values, and stores them in the parameter holding block 5. Furthermore, the saturation conversion block 13 corrects saturation in units of pixels on the basis of the saturation conversion parameters stored in the parameter holding block 5, and writes the corrected image again in the image buffer. Note that such saturation correction processes will be explained in detail later with reference to FIG. 12.

In step S8, the image output block 3 reads out the image data stored in the image buffer 4, and outputs it as an output image 14.

[Parameter]

The parameters stored in the parameter holding block 5 will be explained below. FIG. 4 shows register items in the parameter holding block. Referring to FIG. 4, as parameters for white balance adjustment, a highlight point (LH) of image data, white balance values (RH, GH, BH) for red, green, and blue, a corrected highlight point (HP), and a highlight area value are held. Likewise, as parameters for black balance adjustment, a shadow point (LS) of image data, black balance values for red, green, and blue, a corrected shadow point (SP), and a shadow area value are held.

To implement saturation conversion, a low-saturation side saturation conversion parameter, and a high-saturation side saturation conversion parameter are held. Furthermore, attribute dependent saturation values A, B, and C indicating appropriate saturation values corresponding to individual image attributes are held. In this embodiment, assume that attribute dependent saturation values A, B, and C respectively hold saturation values corresponding to selected attributes, i.e., flesh tone, green of plants, and blue of sky.

In the initial state of this embodiment, these parameters are initialized to appropriate values. For example, "245" is set as the corrected highlight point (HP), and "10" is set as the corrected shadow point (SP). Note that in this embodiment the highlight area ranges from 99 to 100%, and the shadow area from 0 to 1%. Also, for example, the low-saturation side saturation conversion parameter is initialized to "40", and the high-saturation side saturation conversion parameter is initialized to "20".

Moreover, attribute dependent saturation A corresponding to flesh tone is initialized to "0.4", attribute dependent saturation B corresponding to green of plants is initialized to "0.3", and attribute dependent saturation C corresponding to blue of sky is initialized to "0.4". Note that attribute dependent saturation values A, B, and C can be appropriately changed in correspondence with image characteristics, user request, and the like.

[Image Attribute Discrimination Process]

FIG. 5 is a flow chart showing the image attribute discrimination process in the image attribute discrimination block 15. That is, FIG. 5 shows the contents of step S2 in FIG. 3 in detail.

In step S41, the entire image is segmented into a plurality of blocks. For example, the entire image is segmented into a total of 15 blocks=3 blocks (vertical)×5 blocks (horizontal). In step S42, image data of one of the segmented blocks is analyzed to set an attribute of that block.

Note that attributes include specific objects such as "person", "flower", and the like, non-objects such as "sky", "grass", "ground", "general background", and the like, a block, most of which is oversaturated to white (to be referred to as a "white block" hereinafter"), an unidentifiable block (to be referred to as "other" hereinafter), and the like. Note that information of such attributes may be pre-stored in, e.g., the ROM 101, or may be stored in the RAM 103, storage unit 8, or the like so that they can be updated. Various methods of discriminating an attribute corresponding to an image block have been proposed, and an attribute may be discriminated using any of such methods. Hence, a detailed description of the discrimination method will be omitted.

FIGS. 6A and 6B show examples in which an image is segmented into blocks, and attributes are assigned in units of blocks. FIG. 6A shows an example in which attribute "person" is assigned to the central block of the image, and attribute "other" is assigned to the block underneath that block. Attribute "general background" is assigned to other blocks. In case of this image, the block assigned attribute "person" undergoes saturation conversion so that its saturation becomes "0.4" corresponding to attribute dependent saturation A held in the parameter holding block 5.

In FIG. 6B, attribute "sky" is assigned to the two upper rows of blocks, and in the lowermost row of blocks attribute "other" is assigned to the two left blocks and attribute "ground" to the three right blocks. In case of this image, the blocks assigned attribute "sky" undergo saturation conversion so that their saturation values become "0.4" corresponding to attribute dependent saturation C held in the parameter holding block 5. Note that saturation conversion in this embodiment will be described in detail later.

It is then checked in step S43 in FIG. 5 if attributes are assigned to all blocks. If NO in step S43, the flow returns to step S42.

[Highlight/Shadow Calculation Process]

Figure 7:
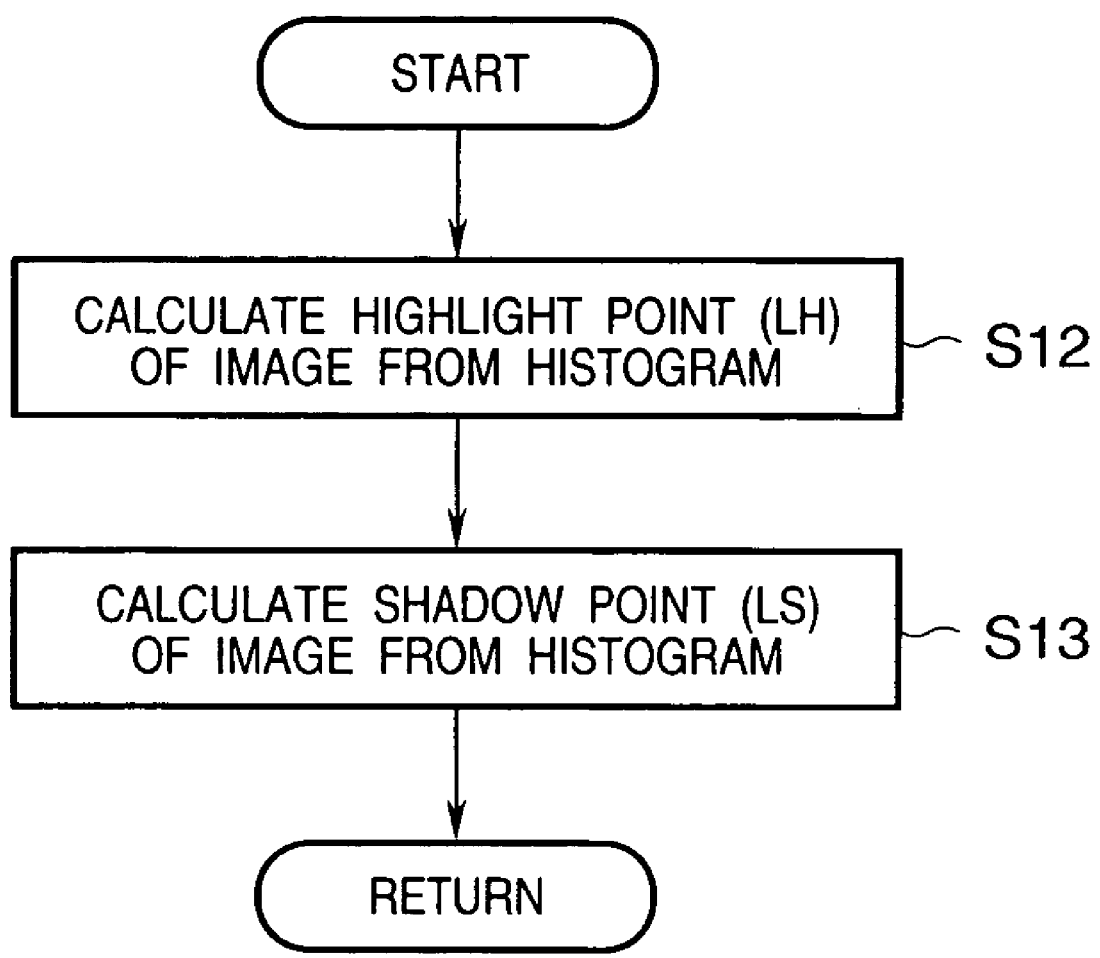
FIG. 7 is a flow chart showing a highlight/shadow calculation process.
Figure 8:
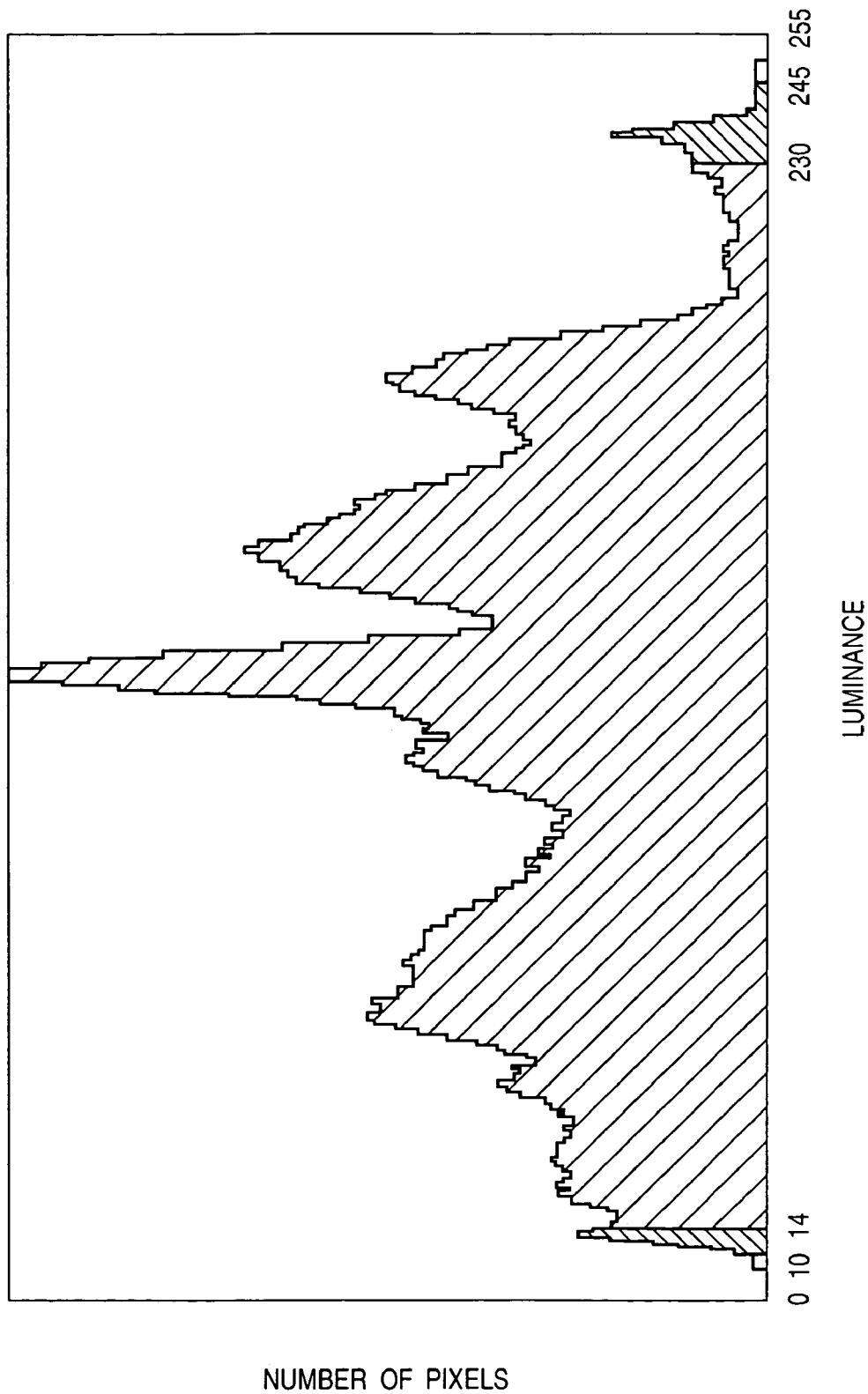
FIG. 8 is a graph showing an example of a luminance histogram.

FIG. 7 is a flow chart showing the highlight/shadow calculation process in the highlight/shadow calculation block 8. That is, FIG. 7 shows the contents of step S4 in FIG. 3 in detail. FIG. 8 shows an example of the luminance histogram generated in step S3 in FIG. 3.

In step S12, a highlight point LH of the image is calculated on the basis of the luminance histogram shown in FIG. 8. Note that the highlight point LH is the lowest luminance value in the highlight area of the image. Hence, in the luminance histogram example shown in FIG. 8, since the luminance range corresponding to the highlight area (99 to 100%) ranges from 230 to 255, the highlight point LH is "230". This result is stored in a corresponding register in the parameter holding block 5.

In step S13, a shadow point LS of the image is calculated on the basis of the luminance histogram shown in FIG. 8. Note that the shadow point LS is a highest luminance value in the shadow area of the image. Hence, in the luminance histogram example shown in FIG. 8, since the luminance range corresponding to the shadow area (0 to 1%) ranges from 0 to 14, the shadow point LS is "14". This result is stored in a corresponding register in the parameter holding block 5.

[White/black Balance Calculation Process]

Figure 9:
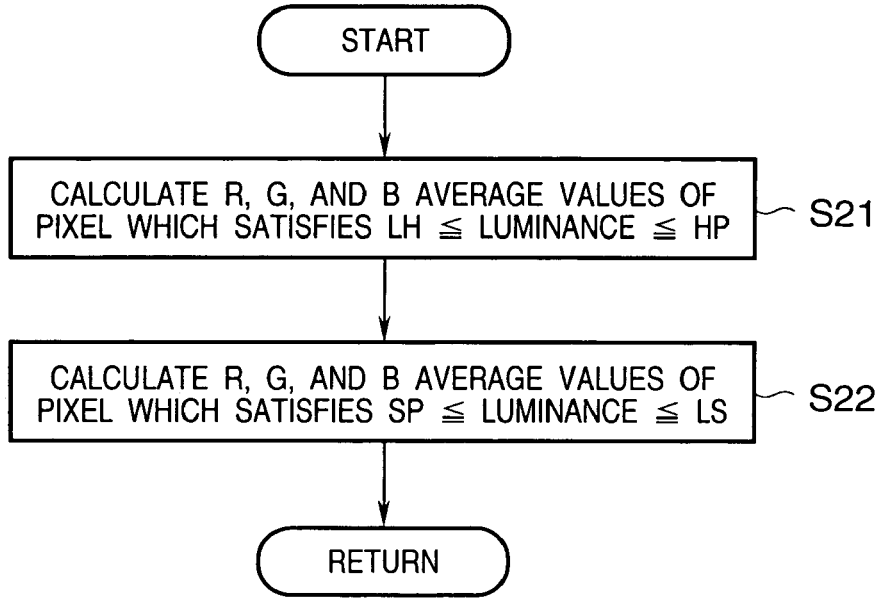
FIG. 9 is a flow chart showing a white/black balance calculation process.

FIG. 9 is a flow chart showing the white/black balance calculation process in the white/black balance calculation block 9. That is, FIG. 9 shows the contents of step S5 in FIG. 3 in detail.

In step S21, white balance values are calculated. More specifically, image data is loaded from the image buffer 4 in units of pixels, and R, G, and B average luminance values (white balance values) of pixels whose luminance values are equal to or higher than the highlight point LH and equal to or lower than a corrected highlight point HP are calculated. In the luminance histogram example shown in FIG. 8, pixels whose luminance values fall within the area ranging from LH=230 to HP=245 undergo this process. The obtained average values are stored in corresponding registers RH, GH, and BH of the parameter holding block 5.

In step S22, black balance values are calculated. More specifically, image data is loaded from the image buffer 4 in units of pixels, and R, G, and B average luminance values (black balance values) of pixels whose luminance values are equal to or higher than a corrected shadow point SP and equal to or lower than the shadow point LS are calculated. In the luminance histogram example shown in FIG. 8, pixels whose luminance values fall within the area ranging from SP=10 to LS=14 undergo this process. The obtained average values are stored in corresponding registers RS, GS, and BS of the parameter holding block 5.

[Image Correction Process]

Figure 10:
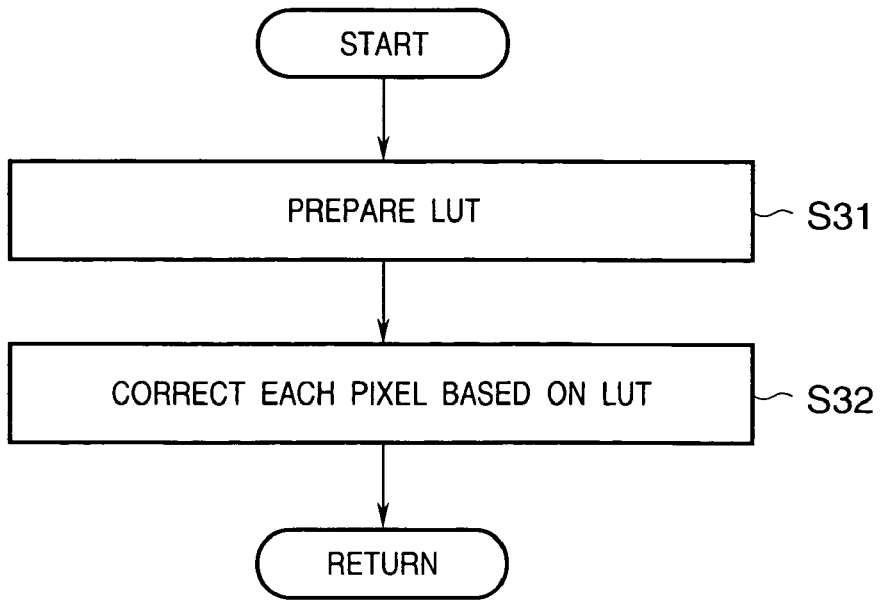
FIG. 10 is a flow chart showing an image correction process.

FIG. 10 is a flow chart showing the image correction process in the image correction block 10. That is, FIG. 10 shows the contents of step S6 in FIG. 3 in detail.

Figure 11:
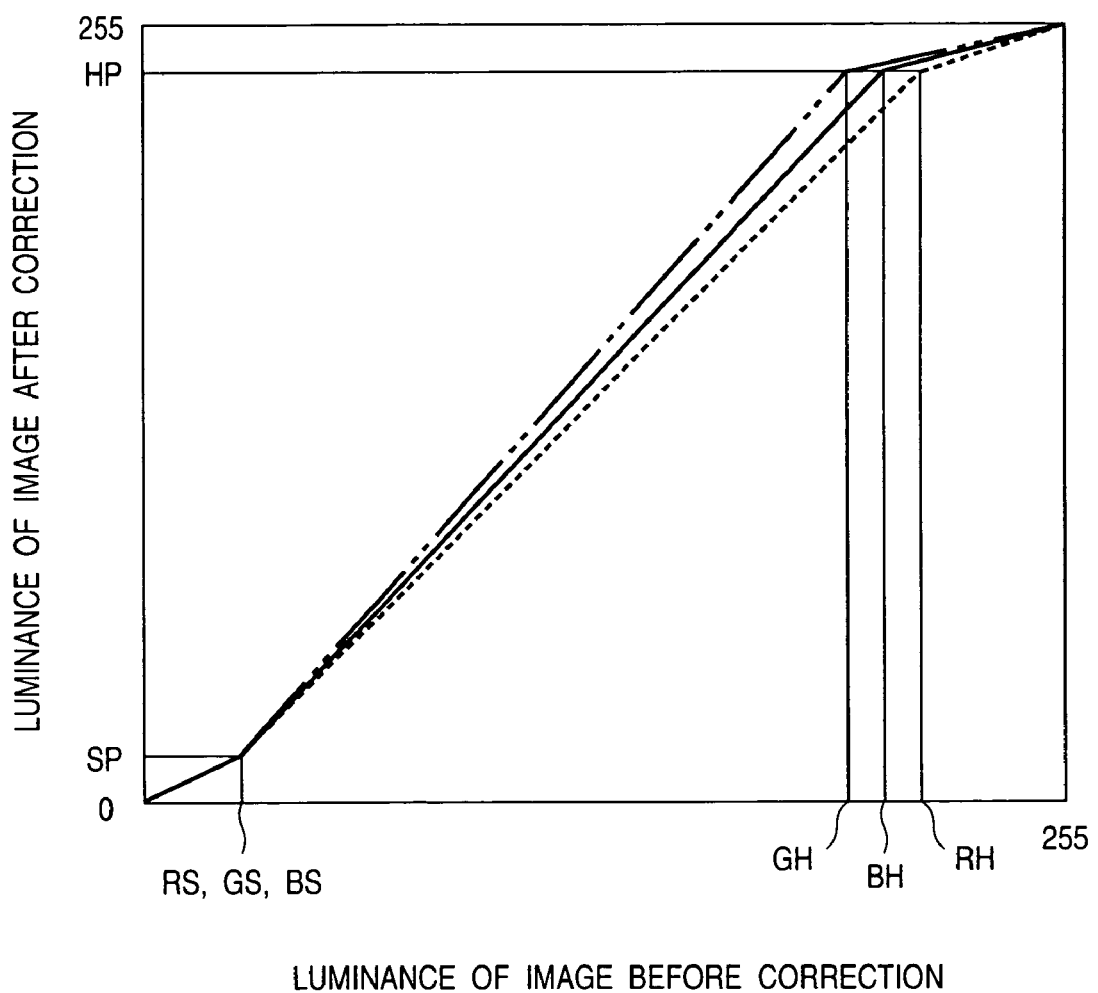
FIG. 11 is a graph showing an example of the characteristics of a look-up table.

In step S31, a look-up table (LUT) is prepared on the basis of the white balance values (RH, GH, BH) of the individual colors, highlight point HP, black balance values (RS, GS, BS), and shadow point LS held in the parameter holding block 5. FIG. 11 shows an example of the prepared LUT. In the LUT shown in FIG. 11, the highlight portion has steeper gamma correction characteristics in the order of G, B, and R. In this way, by emphasizing G and B with respect to R, so-called color tint of an image tinged with blue (blue cast) can be corrected.

In step S32, the image data stored in the image buffer 4 is corrected in units of pixels on the basis of the prepared LUT.

[Saturation Conversion Process]

Figure 12:
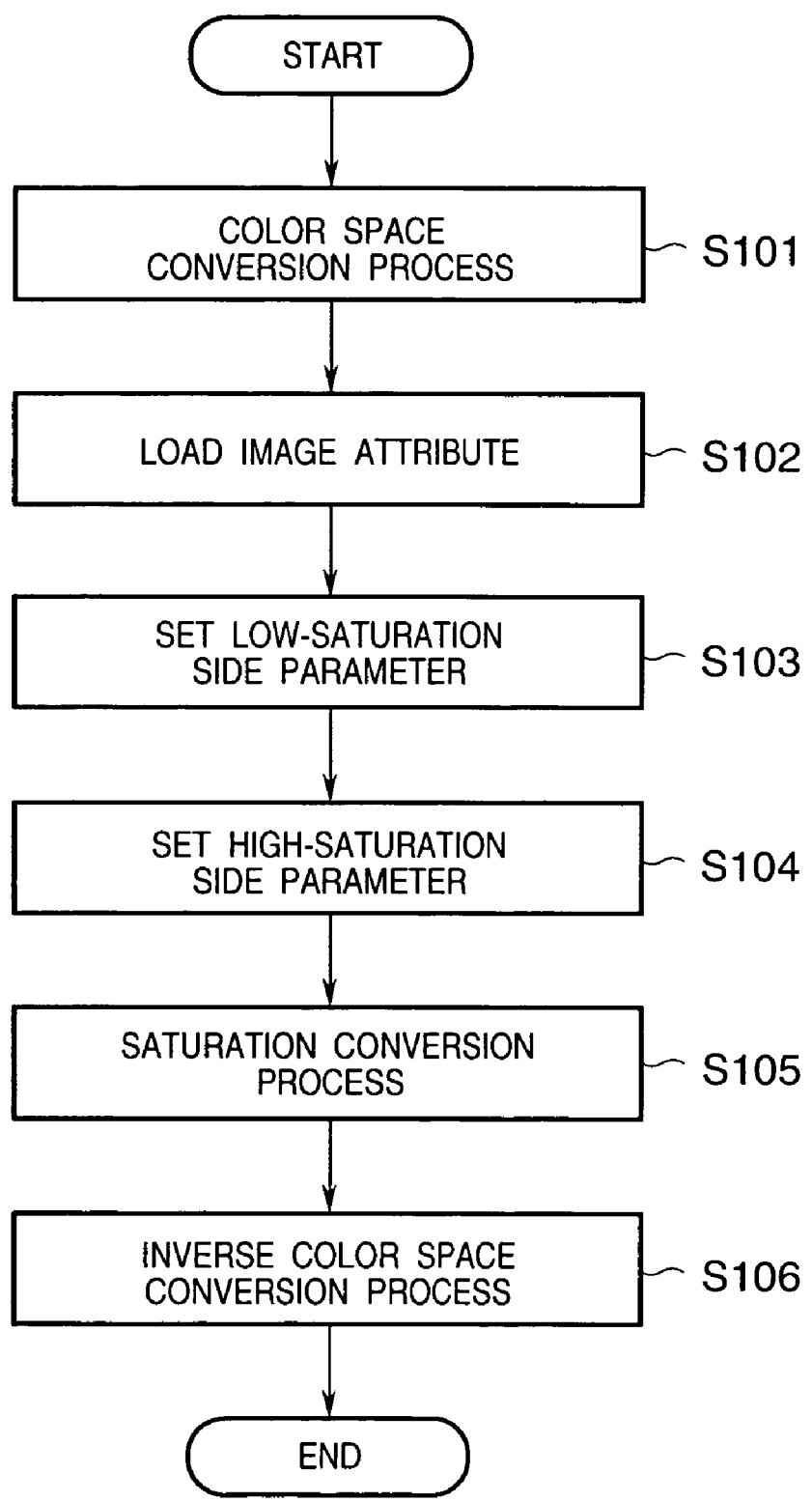
FIG. 12 is a flow chart showing a saturation conversion process.

FIG. 12 is a flow chart showing the saturation conversion process as the characteristic feature of this embodiment. This process shows the contents of step S7 in FIG. 3 in detail, and is implemented by the saturation calculation block 11, saturation conversion parameter setting block 12, and saturation conversion block 13.

Color Space Conversion Process

Figure 13:
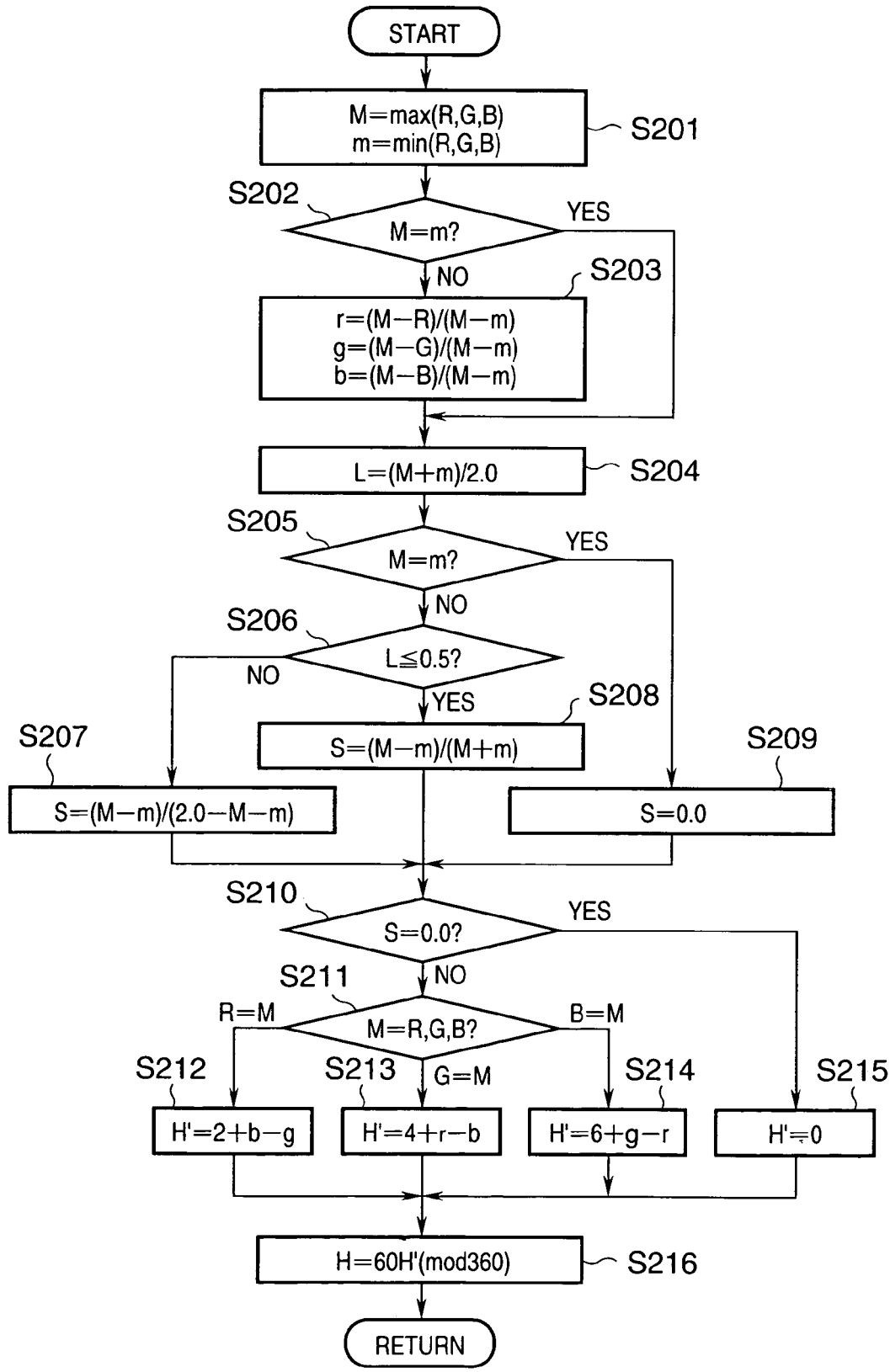
FIG. 13 is a flow chart showing a color space conversion process.

In step S101, the saturation calculation block 11 converts image data expressed in the RGB color space into HLS data in the HLS color space indicating hue, lightness, and saturation. FIG. 13 is a flow chart showing the process for converting RGB data into HLS data in units of pixels, and this process will be explained below. Note that the present invention is not limited to such specific saturation calculation method, and other methods may be used.

Referring to FIG. 13, a maximum value M and minimum value m of R, G, and B color component data of the pixel of interest are obtained (S201). The obtained maximum and minimum values M and m are compared (step S202). If the two values are equal to each other, i.e., if R=G=B and the pixel of interest has achromatic color, the flow advances to step S204. If the two values are not equal to each other, the following values are calculated in step S203:

$r=(M-R)/(M-m)$ $g=(M-G)/(M-m)$ $b=(M-B)/(M-m)$

In step S204, lightness L is calculated by:

$L=(M+m)/2.0$

It is checked if the pixel of interest is achromatic color or if lightness L is equal to or lower than a predetermined value (0.5) if the pixel of interest is not achromatic color (S205, S206), and saturation S is calculated according to the discrimination result by (S207 to S209):

Achromatic color:$S=0$

Chromatic color $L \leq 0.5$:$S=(M-m)/(M+m)$

Chromatic color $L>0.5$:$S=(M-m)/(2.0-M-m)$

It is then checked if the pixel of interest is achromatic color or which color component the maximum value M corresponds to if the pixel of interest is not achromatic color (S210, S211), and hue H is calculated according to the discrimination result by (S212 to S216):

| | |
|---|---|
| Achromatic color | H' = 0 |
| Chromatic color R = M | H' = 2 + b − g |
| Chromatic color G = M | H' = 4 + r − b |
| Chromatic color B = M | H' = 6 + g − r |
| H = 60 H' (mod360) | |

Note that the hue of achromatic color is defined to be zero in this embodiment.

As described above, the conversion process shown in FIG. 13 converts RGB data indicating one pixel into HLS data including hue H ranging from 0° to 360° (blue: 0°, red: 120°, green: 240°), lightness L ranging from 0.0 to 1.0 (black to white), and saturation S ranging from 0.0 to 1.0 (achromatic color to most vivid color for certain saturation).

Load Image Attribute

In step S102 in FIG. 12, image attribute information of each block discriminated by the image attribute discrimination block 7 is loaded from the parameter holding block 5.

Saturation Conversion Parameter Setup and Saturation Conversion Process

In steps S103 and S104, the saturation conversion parameter setting block 12 determines low- and high-saturation side conversion parameters, and stores them in the parameter holding block 5.

Note that the method of determining the low- and high-saturation side conversion parameters will be described in detail later.

In step S105, the saturation conversion block 13 performs saturation conversion of HLS data of an original image on the basis of the saturation conversion parameters set in steps S103 and S104.

Setups of these two saturation conversion parameters and details of the saturation conversion process using these parameters will be explained below with reference to FIG. 14.

Figure 14:
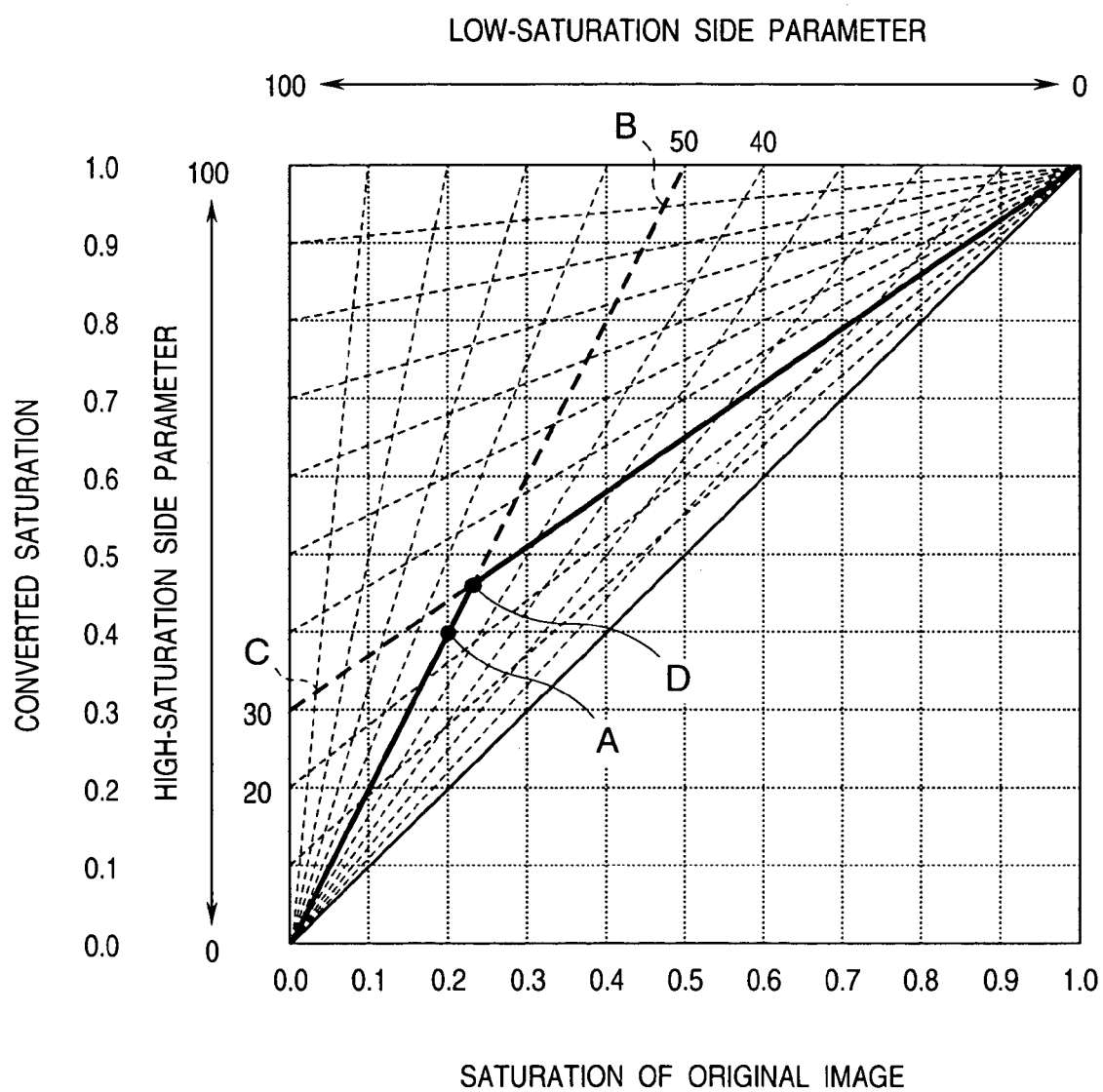
FIG. 14 is a graph showing an example of saturation conversion characteristics.

FIG. 14 is a graph showing the saturation conversion characteristics in this embodiment. The abscissa plots the saturation values (0.0 to 1.0) of an original image, and the ordinate plots the converted saturation values (0.0 to 1.0). The abscissa and ordinate respectively also plot low- and high-saturation side conversion parameters, which respectively assume values ranging from 0 to 100, and correspond to conversion lines.

In FIG. 14, if the lower left point of the graph that corresponds to saturation=0.0 of the original image and to converted saturation=0.0 is defined as an origin, for example, a low-saturation side parameter="0" means a line that connects the origin (0.0, 0.0) and the upper right point (1.0, 1.0) of the graph, and a low-saturation side parameter="100" means a line that connects the origin (0.0, 0.0) and the upper left point (0.0, 1.0) of the graph. By equally dividing each line into 100 sections, lines corresponding to low-saturation side parameter values ranging from 0 to 100 can be obtained. Hence, when the low-saturation side saturation conversion parameter is, e.g., "40", it indicates a line that connects the origin (0.0, 0.0) and a point (0.6, 1.0).

On the other hand, a high-saturation side parameter "0" means a line that connects the upper right point (1.0, 1.0) and the origin (0.0, 0.0) of the graph, and a high-saturation side parameter="100" means a line that connects the upper right point (1.0, 1.0) and the upper left point (0.0, 1.0) of the graph. By equally dividing each line into 100 sections, lines corresponding to high-saturation side parameter values ranging from 0 to 100 can be obtained. Hence, when the high-saturation side saturation conversion parameter is, e.g., "20", it indicates a line that connects the upper right point (1.0, 1.0) and a point (0.0, 0.2) of the graph.

Figure 15:
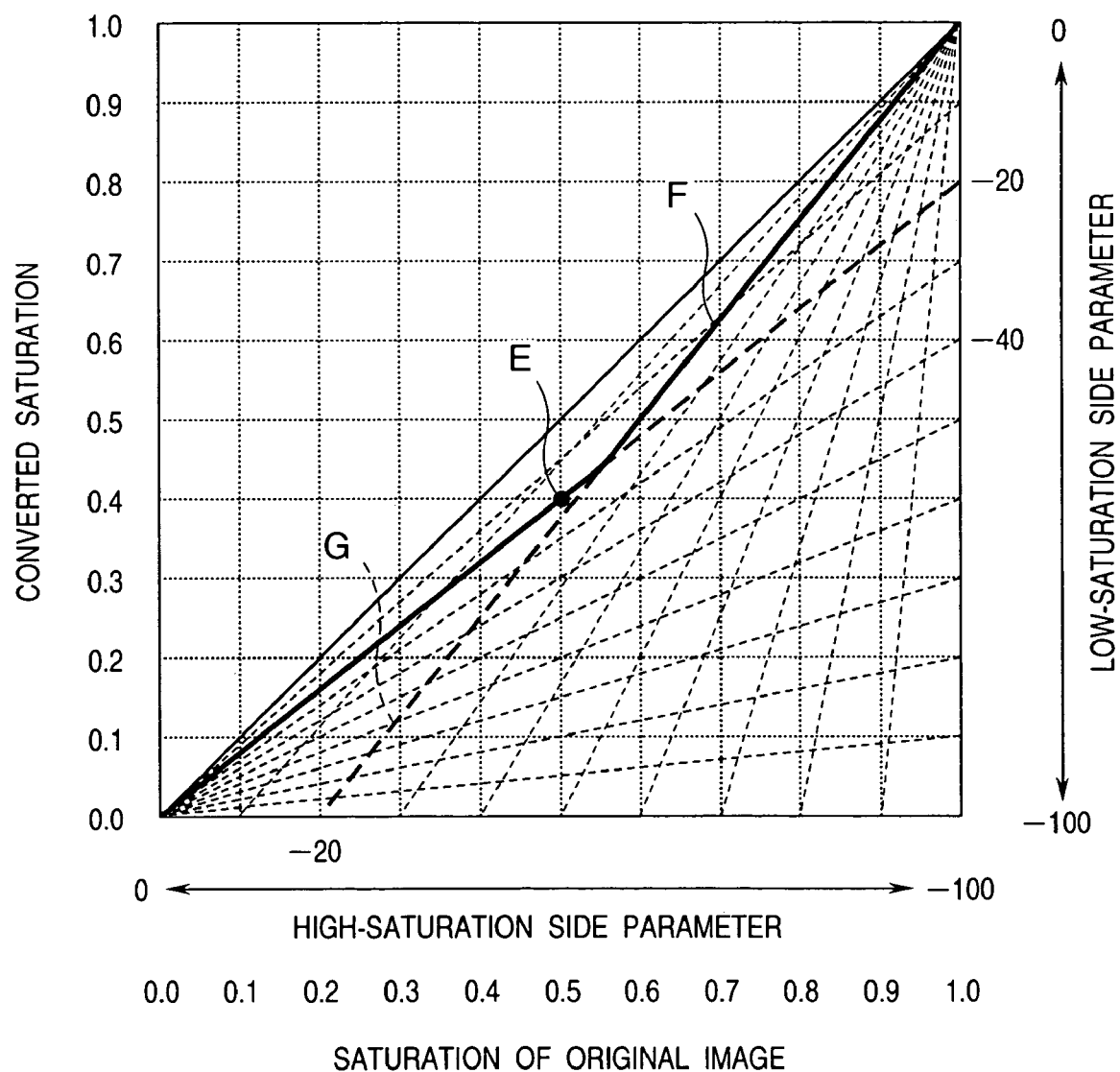
FIG. 15 is a graph showing an example of saturation conversion characteristics.

Note that FIG. 14 exemplifies the conversion characteristics that increase saturation. Likewise, conversion characteristics that decrease saturation are available. FIG. 15 shows an example of the conversion characteristics that decrease saturation.

Referring to FIG. 15, the abscissa plots the saturation values (0.0 to 1.0) of an original image, and the ordinate plots the converted saturation values (0.0 to 1.0). The abscissa and ordinate respectively plot high- and low-saturation side conversion parameters, which respectively also assume values ranging from 0 to 100, and correspond to conversion lines.

In FIG. 15, if the lower left point of the graph that corresponds to saturation=0.0 of the original image and to converted saturation=0.0 is defined as an origin, for example, a low-saturation side parameter="0" means a line that connects the origin (0.0, 0.0) and the upper right point (1.0, 1.0) of the graph, and a low-saturation side parameter="−100" means a line that connects the origin (0.0, 0.0) and the lower right point (1.0, 0.0) of the graph. By equally dividing each line into 100 sections, lines corresponding to low-saturation side parameter values ranging from 0 to −100 can be obtained. Hence, when the low-saturation side saturation conversion parameter is, e.g., "−40", it indicates a line that connects the origin (0.0, 0.0) and a point (1.0, 0.6).

On the other hand, a high-saturation side parameter="0" means a line that connects the upper right point (1.0, 1.0) and the origin (0.0, 0.0) of the graph, and a high-saturation side parameter="−100" means a line that connects the upper right point (1.0, 1.0) and the lower right point (1.0, 0.0) of the graph. By equally dividing each line into 100 sections, lines corresponding to high-saturation side parameter values ranging from 0 to −100 can be obtained. Hence, when the high-saturation side saturation conversion parameter is, e.g., "−20", it indicates a line that connects the upper right point (1.0, 1.0) of the graph and a point (0.2, 0.0).

Note that the saturation conversion characteristics shown in FIGS. 14 and 15 may be pre-stored in, e.g., the ROM 101, or may be stored in the RAM 103, storage unit 8, or the like so that they can be updated.

The method of determining low- and high-saturation side conversion parameters in this embodiment will be described below.

In this embodiment, when an image includes a block having image attribute "person", the saturation conversion parameters are set so that the saturation of that block becomes "0.4" corresponding to attribute dependent saturation A held in the parameter holding block 5. Likewise, when an image includes a block having image attribute "plant" or "sky", the saturation conversion parameters are set so that the saturation of that block becomes "0.3 or "0.4" corresponding to attribute dependent saturation B or C held in the parameter holding block 5.

For example, in FIG. 6(a), if the block assigned image attribute "person" has saturation (e.g., average saturation of pixels in a block)="0.2", that saturation must be converted into "0.4". In this case, since conversion for increasing saturation is required, a point for converting saturation="0.2" into "0.4" corresponds to point A (0.2, 0.4) on the graph, as can be seen from the lines shown in FIG. 14. Hence, lines that pass through or are closest to point A are set as the saturation conversion parameters. In this case, since lines B and C pass through the vicinities of point A for low- and high-saturation side saturation conversion parameters, "50" and "30" are respectively set as the low- and high-saturation side saturation conversion parameters in steps S103 and S104.

In FIG. 6(b), when the block assigned image attribute "sky" has saturation="0.5", that saturation must be converted into "0.4". In this case, since conversion for decreasing saturation is required, a point for converting saturation="0.5" into "0.4" corresponds to point E (0.5, 0.4) on the graph, as can be seen from the lines in FIG. 15. Hence, by setting lines that pass through or are closest to point E as the saturation conversion parameters, "−20" corresponding to lines F and G are respectively set as the low- and high-saturation side saturation conversion parameters in steps S103 and S104.

On the other hand, if an image includes none of blocks having image attributes "person", "plant", "sky", and the like, i.e., if an image has no blocks corresponding to the attribute dependent saturation values held in the parameter holding block 5, default values "40" and "20" are respectively set as the low- and high high-saturation side saturation conversion parameters in steps S103 and S104.

Based on the two, low- and high-saturation side conversion lines set in this manner, saturation conversion characteristics actually used in the saturation conversion process are calculated. For example, in FIG. 14, when "50" and "30" are respectively set as the low- and high-saturation side saturation conversion parameters, the two corresponding lines cross at point D. Hence, in step S105, a line that connects the origin (0.0, 0.0), point D, and the upper right point (1.0, 1.0) of the graph is calculated as the saturation conversion characteristics, and the saturation (S) component of the HLS data converted in step S101 undergoes saturation conversion based on the calculated characteristics. According to the saturation conversion characteristics, the converted saturation neither becomes 0.0 (achromatic color) nor is saturated at 1.0.

In this manner, since different saturation parameters can be set at the low- and high-saturation sides, oversaturation or undersaturation due to saturation conversion can be avoided, and appropriate saturation correction can be achieved at both sides.

Inverse Color Space Conversion Process

Figure 16:
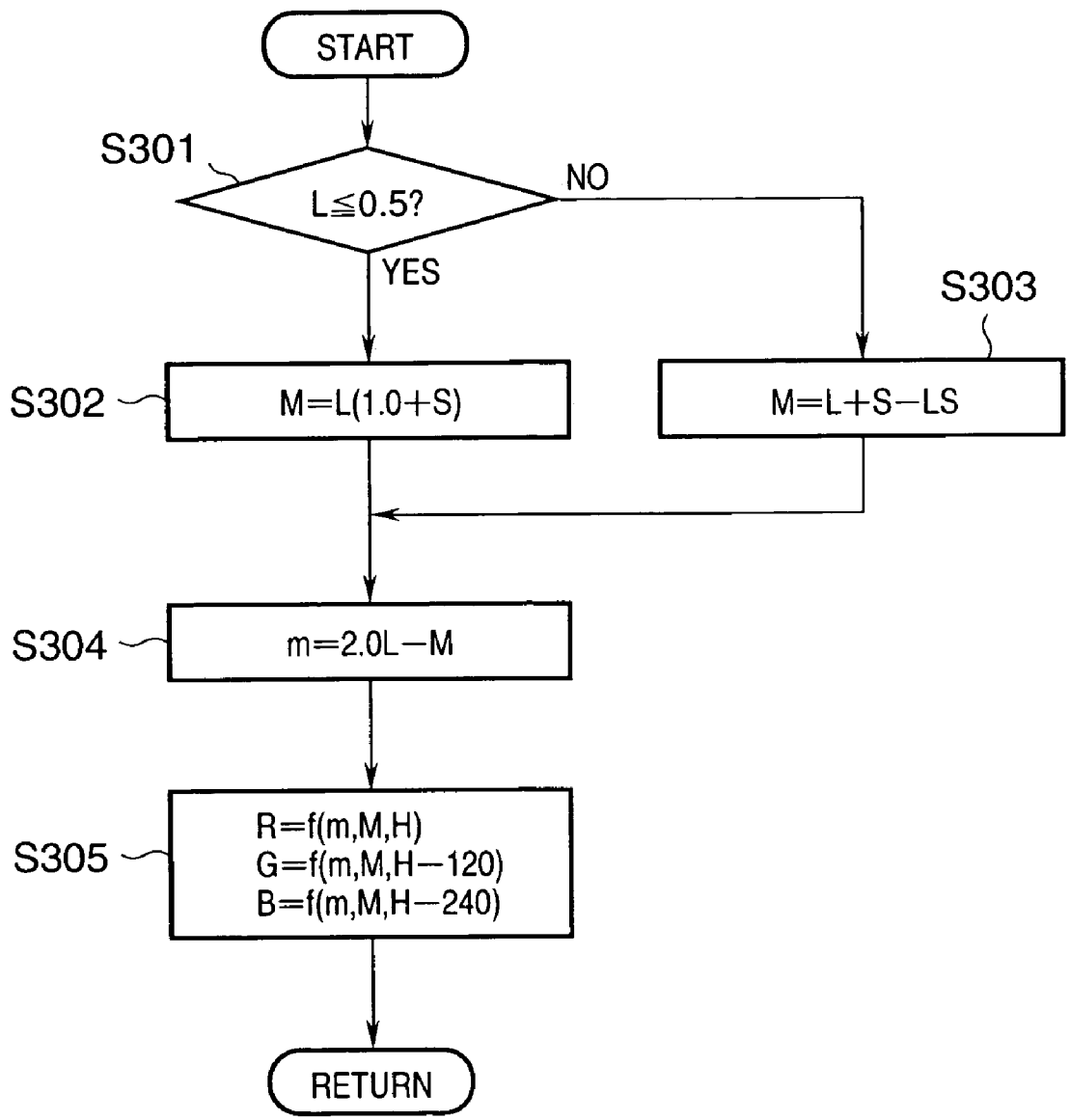
FIG. 16 is a flow chart showing an inverse color space conversion process.

After the HLS data has undergone saturation conversion, the saturation calculation block 11 inversely converts the saturation-converted HLS data into RGB data in step S106 in FIG. 12. FIG. 16 is a flow chart showing the inverse conversion process from HLS data into RGB data, and this process will be explained below.

Referring to FIG. 16, it is checked if a lightness value L is equal to or higher than a predetermined value (0.5) (S301). If YES in step S301, parameter M=L(1.0+S) is set (S302); otherwise, M=L+S−LS is set (S303). After parameter m=2.0L−M is set (S304), R, G, and B color component values are calculated using a function f(m, M, h) by (S305):

$$R = f(m, M, H)$$
$$G = f(m, M, H - 120)$$
$$B = f(m, M, H - 240)$$

Note that depending on the value h, the function f(m, M, h) is determined by:

| | |
|---|---|
| $0 \leq h < 60$ | $f(m, M, h) = m + (M - m)h/60$ |
| $60 \leq h < 180$ | $f(m, M, h) = M$ |
| $180 \leq h < 240$ | $f(m, M, h) = m + (M - m)(240 - h)/60$ |
| $240 \leq h < 360$ | $f(m, M, h) = m$ |

Note that if h is a negative value, a value obtained by adding 360 to h is referred to.

In this manner, the saturation-converted HLS data is inversely converted into RGB data, and the converted data is held in the buffer 4. Then, the RGB data is output as an output image 14 (S8).

In this embodiment, the default value of the low-saturation side saturation conversion parameter is set at "40", and that of the high-saturation side saturation conversion parameter is set at "20". However, the present invention is not limited to such specific default values of the parameters, and any other values may be set if they fall within an allowable setting range (0 to 100 in the above embodiment).

Furthermore, the saturation conversion parameters may be directly set according to user instruction. More specifically, the user may change the parameters set by the saturation conversion parameter setting block 12 via the keyboard I/F 109. For example, the user may directly designate an image attribute, and the saturation conversion parameters may be set in correspondence with the designated image attribute.

As shown in FIGS. 14 and 15, in this embodiment, the saturation conversion parameters correspond to saturation conversion lines. However, the saturation conversion characteristics of the present invention are not limited to lines but may be defined by curves. That is, appropriate lines or curves need only be set as saturation conversion characteristics so as to achieve appropriate saturation conversion.

As described above, according to this embodiment, since an image attribute is discriminated, and the saturation conversion characteristics can be set in correspondence with the discrimination result, optimal saturation conversion can be implemented in accordance with the image attribute. Especially, saturation conversion can be satisfactorily made in correspondence with memory color such as flesh tone of a human being, and the like that a person notices and reacts sensitively to their delicate conversion results.

Since the saturation conversion characteristics can vary at the low- and high-saturation sides, flexible saturation conversion can be attained, and chromatic color can be prevented from becoming achromatic at the low-saturation side or being saturated at the high-saturation side as a result of saturation conversion.

<Modification>

In the above embodiment, only one of attributes "person", "plant", and "sky" appears in the image to be converted. However, two or more image attributes (e.g., person" and "sky") are highly likely to be assigned to one image. In such case, no problem is posed if a saturation conversion parameter common to the plurality of attributes can be set, and saturation conversion which can satisfy all the assigned attributes can be achieved.

However, if a common saturation conversion parameter cannot be set, priority must be set among attributes. For example, priority may be set in the order of "person">"sky">"plant". Of course, the present invention is not limited to such specific priority order, and priority can be arbitrarily set in correspondence with the type of scene of an image, the image forming situation in the image processing apparatus, or user request.

In the above embodiment, three different attributes "person", "plant", and "sky" are weighted upon saturation conversion, and attribute dependent saturation values corresponding to these attributes are held in the parameter holding block 5. However, attribute dependent saturation values corresponding to other attributes such as "sea" and the like may be added to the parameter holding block 5.

Furthermore, attribute "person" which corresponds to flesh tone may be divided into "white race", "black race", "yellow race", and the like, and attribute "sky" may be divided into "cloudy", "fine" "evening glow", "night sky", and the like, and corresponding attribute dependent saturation values may be added. That is, optimal saturation values corresponding to individual attributes can be set in the parameter holding block 5.

The number of segmented blocks upon image attribute discrimination is not limited to 3×5 blocks in the above embodiment. For example, the image may be segmented into still smaller blocks such as 5×7 blocks and the like, or the number of segmented blocks may be adaptively determined in consideration of the aspect ratio of an image. Furthermore, the shape of one block is not limited to a rectangular shape, but may be a triangular shape, hexagonal shape, trapezoidal shape, and the like.

In the above embodiment, the saturation conversion parameters are set so that the average saturation of pixel in a given block assigned a predetermined attribute becomes a predetermined value. Alternatively, a principal object in a given block may be extracted by a known recognition technique, and the saturation conversion parameter may be set based on the average saturation of only pixels that form the principal object. In this manner, correction which is free from any influences of the background and is optimal to the principal object can be achieved.

OTHER EMBODIMENTS

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores program codes corresponding to the aforementioned flow charts (FIGS. 3, 5, 7, 9, 10, 12, 13, and 16).

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   holding means for holding saturation information in correspondence with a plurality of attributes;
   segmentation means for segmenting an input image into a plurality of areas;
   discriminating means for discriminating attributes of each area, and setting an attribute of the input image based on the attributes of those areas;
   saturation calculation means for calculating saturation information of an area that has the set attribute;
   parameter setting means for setting a parameter used to convert saturation of the input image in accordance with the held saturation information in correspondence with the set attribute of the input image, and the calculated saturation information; and
   conversion means for converting saturation of the input image, using the set parameter.

2. The apparatus according to claim 1, wherein the set attribute is a color attribute of the input image.

3. The apparatus according to claim 1, wherein the set attribute is set in correspondence with an object in the input image.

4. The apparatus according to claim 3, wherein the set attribute includes at least one of attributes "person", "flower", "sky", "grass", "ground", and "general background".

5. The apparatus according to claim 3, wherein the area attributes are selected from a set of eligible candidates, one member of that set being a catchall attribute "other".

6. The apparatus according to claim 1, wherein said holding means holds optimal saturation values in units of attributes.

7. The apparatus according to claim 1, wherein said segmentation means segments the input image into a plurality of blocks.

8. The apparatus according to claim 1, wherein said discrimination means selects an attribute with high priority from the attributes of the plurality of the areas, and set the selected attribute as an attribute of the input image.

9. The apparatus according to claim 1, wherein said parameter setting means sets a plurality of parameters.

10. The apparatus according to claim 1, further comprising:
    detection means for detecting highlight portion and shadow portion of the input image:
    generation condition setting means for setting a gradation condition on the basis of the highlight portion and the shadow portion; and
    gradation correction means for performing gradation correction of the input image on the basis of the gradation condition.

11. The apparatus according to claim 10, wherein said conversion means performs saturation conversion, by using the set parameter, for an image which has undergone the gradation correction by said gradation correction means.

12. An image processing apparatus, comprising:
    characteristic discrimination means for discriminating characteristics of an image;
    saturation calculation means for calculating saturation information of the image;
    parameter setting means for setting a parameter used to convert saturation of the image in accordance with the characteristics discriminated by said characteristic discrimination means;
    saturation conversion means for converting the saturation of the image on the basis of the parameter;
    detection means for detecting a color distribution of the image;
    generation means for generating gradation correction information of the image on the basis of the color distribution; and
    gradation correction means for performing gradation correction of the image on the basis of the gradation correction information,
    wherein said generation means comprises:
       highlight calculation means for calculating highlight area information of an image on the basis of the color distribution; and
       white balance calculation means for calculating white balance information on the basis of the highlight area information and a predetermined highlight value, and
    wherein said gradation correction means corrects gradation of the image on the basis of the white balance information and the highlight value.

13. An image processing apparatus, comprising:
    characteristic discrimination means for discriminating characteristics of an image;
    saturation calculation means for calculating saturation information of the image;
    parameter setting means for setting a parameter used to convert saturation of the image in accordance with the characteristics discriminated by said characteristic discrimination means;
    saturation conversion means for converting the saturation of the image on the basis of the parameter;
    detection means for detecting a color distribution of the image;
    generation means for generating gradation correction information of the image on the basis of the color distribution; and
    gradation correction means for performing gradation correction of the image on the basis of the gradation correction information,
    wherein said generation means comprises:
       shadow calculation means for calculating shadow area information of an image; and
       black balance calculation means for calculating black balance information on the basis of the shadow area information and a predetermined shadow value, and
    wherein said gradation correction means corrects gradation of the image on the basis of the black balance information and the shadow value.

14. An image processing method comprising the steps of:
holding saturation information in correspondence with a plurality of attributes;
segmenting an input image into a plurality of areas;
discriminating attributes of each area, and setting an attribute of the input image on the basis of the attributes of those areas;
calculating saturation information an area that has the set attribute;
setting a parameter used to convert saturation of the input image in accordance with held saturation information in correspondence with the set attribute of the input image, and the calculated saturation information; and
converting saturation of the input image, using the set parameter.

15. The method according to claim 14, wherein the set attribute is a color attribute of the input image.

16. The method according to claim 14, wherein said segmenting step includes the step of segmenting the input image into a plurality of blocks.

17. A computer readable medium storing program codes of an image processing method at least comprising:
code for a holding step, of holding saturation information in correspondence with a plurality of attributes;
code for a segmenting step, of segmenting an input image into a plurality of areas;
code for a discriminating step, of discriminating attributes of each area, and setting an attribute of the input image based on the attributes of those areas;
code for a saturation calculation step, of calculating saturation information of an area that has the set attribute;
code for a parameter setting step, of setting a parameter used to convert saturation of the input image in accordance with the held saturation information in correspondence with the set attribute of the input image, and the calculated saturation information; and
code for a conversion step, of converting saturation of the input image, using the set parameter.

18. An image processing apparatus comprising:
a holding unit adapted to hold saturation information in correspondence with a plurality of attributes;
a segmentation unit, adapted to segment an input image into a plurality of areas;
a discriminating unit, adapted to discriminate attributes of each area, and to set an attribute of the input image based on the attributes of those areas;
a saturation calculation unit, adapted to calculate saturation information of an area that has the set attribute;
a parameter setting unit, adapted to set a parameter used to convert saturation of the input image in accordance with the held saturation information in correspondence with the set attribute of the input image, and the calculated saturation information; and
a conversion unit, adapted to convert saturation of the input image, using the set parameter.

* * * * *

UNITED STATES PATENT AND TRADEMARK OFFICE
CERTIFICATE OF CORRECTION

| | |
|---|---|
| PATENT NO. | : 7,013,042 B1 |
| APPLICATION NO. | : 09/420775 |
| DATED | : March 14, 2006 |
| INVENTOR(S) | : Osamu Yamada et al. |

It is certified that error appears in the above-identified patent and that said Letters Patent is hereby corrected as shown below:

ON THE TITLE PAGE [73]:

Assignment, "Canon Research Kaisha, Tokyo (JP)" should read --Canon Kabushiki Kaisha, Tokyo (JP)--.

COLUMN 1:

Line 29, ""memory color"" should read --"memory colors"--;
Line 30, "color" (first occurrence) should read --colors--; and
Line 32, "color." should read --colors.--.

COLUMN 4:

Line 19, "out line" should read --outline--; and
Line 63, "[Parameter]" should read --[Parameters]--.

COLUMN 5:

Line 48, "hereinafter"," should read --hereinafter),--; and
Line 52, "8", should read --108,--.

COLUMN 8:

Line 21, "block 7" should read --block 15--; and
Line 61, "parameter "0"" should read --parameter = "0"--.

COLUMN 9:

Line 43, "storage unit 8," should read --storage unit 108,--.

UNITED STATES PATENT AND TRADEMARK OFFICE
CERTIFICATE OF CORRECTION

PATENT NO. : 7,013,042 B1
APPLICATION NO. : 09/420775
DATED : March 14, 2006
INVENTOR(S) : Osamu Yamada et al.

It is certified that error appears in the above-identified patent and that said Letters Patent is hereby corrected as shown below:

COLUMN 11:

Line 58, "person"" should read --"person"--.

COLUMN 12:

Line 15, "fine" should read --"fine",--.

COLUMN 13:

Line 56, "set" should read --sets--; and
Line 65, "generation" should read --gradation--.

COLUMN 15:

Line 8, "information" should read --information of--.

Signed and Sealed this

Tenth Day of October, 2006

JON W. DUDAS
*Director of the United States Patent and Trademark Office*